US007480718B2

(12) United States Patent
Marcus et al.

(10) Patent No.: US 7,480,718 B2
(45) Date of Patent: Jan. 20, 2009

(54) METHOD FOR PROVIDING SINGLE SIGN-ON USER NAMES FOR WEB COOKIES IN A MULTIPLE USER INFORMATION DIRECTORY ENVIRONMENT

(75) Inventors: Jane B. Marcus, Westford, MA (US); Scott M. Davidson, Chelmsford, MA (US); Russell L. Holden, Boxborough, MA (US); Srinivasa R. Kolaparthi, Nashua, NH (US); Charles W. Kaufman, Sammamish, WA (US)

(73) Assignee: International Business Machines Corporation, Armonk, NY (US)

( * ) Notice: Subject to any disclaimer, the term of this patent is extended or adjusted under 35 U.S.C. 154(b) by 616 days.

(21) Appl. No.: 10/878,299

(22) Filed: Jun. 28, 2004

(65) Prior Publication Data

US 2006/0031494 A1 Feb. 9, 2006

(51) Int. Cl.
*G06F 15/16* (2006.01)
*G06F 15/173* (2006.01)
*G06F 7/04* (2006.01)

(52) U.S. Cl. ........................... 709/225; 709/203; 726/8; 710/36

(58) Field of Classification Search ................. 709/203, 709/225; 710/36; 726/8
See application file for complete search history.

(56) References Cited

U.S. PATENT DOCUMENTS

2002/0010776 A1* 1/2002 Lerner ........................ 709/225
2002/0184507 A1* 12/2002 Makower et al. ............ 713/182

* cited by examiner

*Primary Examiner*—Ario Etienne
*Assistant Examiner*—El Hadji M Sall
(74) *Attorney, Agent, or Firm*—David A. Dagg

(57) ABSTRACT

A method for providing single sign-on (SSO) user names for Web cookies in a multiple user information directory environment. SSO access to multiple applications is supported in situations where multiple user information directories are deployed, and users may be known by multiple identifiers. Convenient specification is enabled for which of a user's multiple names is to be used in an SSO Web cookie that is passed from application to application to enable SSO operation. The user's SSO Web cookie user name is fully separated conceptually from the user's effective name for any given application within the SSO environment. The SSO Web cookie user name is specified independently from the effective name by which the user is known when operating in the Web application that writes the SSO Web cookie back to the user's computer system. Use of an administratively supplied user name in the SSO Web cookie is facilitated.

4 Claims, 4 Drawing Sheets

Web SSO Configuration: LtpaToken
File Edit View Create Actions Help
Address http://banners.valueacd.com/specificpop/304/CheapO4.htm
Edit SSO Configuration Cancel
10
Web SSO Configuration for : LtpaToken
Basics Comments Administration
Token Configuration
Configuration Name: LtpaToken
Organization:
DNS Domain:
12
Map names in LTPA tokens: Enabled
11
15
Token Expiration
Expiration (minutes): 30
Idle Session Timeout ☑ Enabled
Minimum Timeout (minutes): 1
14
Participating Servers
Domino Server Names:
I am active
Office

METHOD FOR PROVIDING SINGLE SIGN-ON USER NAMES FOR WEB COOKIES IN A MULTIPLE USER INFORMATION DIRECTORY ENVIRONMENT

FIELD OF THE INVENTION

The present invention relates generally to network computing and authentication, and more specifically to a method and system for providing single sign-on user names for Web cookies in a multi-directory authentication environment.

BACKGROUND OF THE INVENTION

As it is generally known, computer system users must login to use many application programs or services, typically by entering login information including a user name and password. While users may often need to access multiple programs, it is inconvenient and undesirable for them to have to enter login information more than once. In some existing systems, administrators for Web application programs can configure a Single Sign-On (SSO) environment including multiple applications located on different machines. In these systems, a user logs in once with their user name and password, and is then granted access to the multiple applications contained in the SSO environment. Specifically, when the user's Web browser program accesses an SSO application through its URL (Uniform Resource Locator), they are prompted to login with a user name and password. After the user is authenticated, the application sends a Web page via HTTP (HyperText Transport Protocol) to be displayed by the user's Web browser, as well as a Web cookie containing the user name provided by the user when logging in. The user's Web browser program receives and displays the Web page, and stores the Web cookie on the user's computer system. This stored SSO Web cookie is thereafter used to demonstrate that the user has previously been authenticated. Conventional Web browser operation enables the stored SSO Web cookie to be sent along with subsequent outgoing HTTP requests to Web applications. When an SSO application receives an HTTP request and finds an SSO Web cookie included in the request, the application can accept the SSO Web cookie as proof of the user's previous authentication. Accordingly, the receiving application need not re-prompt the user for a password. The SSO Web cookie in existing systems includes a single user identifier, usually consisting of a distinguished user name for the SSO environment. The receiving application sees the user name in the cookie, and provides access for the user associated with the user name as if they had logged in directly and expressly provided a password.

While these existing systems are useful when a single user information directory is shared across all applications in the SSO environment, they are inadequate in complex SSO configurations in which a user is known by many user names. For example, some existing SSO products, such as Oracle9iAS Single Sign-On provided by Oracle Corporation, expect that applications in the SSO environment share a common user information directory, so that a user effectively has only one distinguished user name in the SSO environment. However, customers must sometimes merge diverse systems into a single SSO environment, in situations where applications have already been deployed with their own user information directories, and potentially their own protocols or formats for naming users. Accordingly, customers may require support for multiple, different user information directories, and need to allow users to have and use multiple identities (i.e. multiple names).

For example, a user may be primarily known in one user information directory by the LDAP format user name "uid=jdoe,cn=users,dc=myorg,dc=com". In another, separate user information directory, the same user may be known by a different name, such as "John M Doe/MyCompany". When a user has multiple names, the existing systems described above are not sufficient to provide effective SSO operation. When the SSO Web cookie is received, the receiving application relies on the user name information within the SSO Web cookie to determine the identity of the user that has been previously authenticated. SSO functionality in these existing systems breaks down if an application receives an SSO Web cookie with a form of user name that it cannot recognize. For example, if an application receives an SSO cookie with the user name "John M Doe/MyCompany", successful SSO operation depends on whether this specific user name can be recognized by the receiving application. SSO support fails if, for example, the receiving application is only equipped to recognize an alternate form of the user's name, such as "uid=jdoe,cn=users,dc=myorg,dc=com".

While it might be possible to embed multiple user names into an SSO Web cookie, such an approach would require applications to agree upon a standard format to represent a user name list, as well as a method for interpreting name lists. While it might be desirable for all applications in an SSO environment to converge to a common strategy for processing a list of names, and/or for recognizing any of a user's multiple names, this is difficult to accomplish across multiple products.

Every application in the SSO environment may be capable of creating an SSO Web cookie for a user when they log in with their user name and password. In existing systems, there is currently no way for an administrator to configure the user name that should appear within an SSO Web cookie for a given user. It would be desirable to have a new system that allows an SSO application to use a name that renders the SSO Web cookie valid not only for the current application, but also has the greatest likelihood to be recognized and validated by other applications in the SSO environment.

Existing products providing identity management and SSO functionality employ different tactics for dealing with multiple user information directories and user names. Some providers allow multiple user information directories, and allow rules to be specified for finding a user among the multiple user information directories. An example of this approach is found in the RadiantOne™ product of Radiant Logic, Inc. However, these existing systems ultimately resolve to one source of identity information for the user. In Netegrity® SiteMinder systems, provided by Netegrity, Inc., a user name is associated with a user profile which is unique in the SSO environment, thus requiring user information to be centrally defined. Given organizational and practical deployment issues for merging together disparate systems into a single SSO environment, requiring one centralized source of user information is not always feasible.

Some existing products for dealing with additional user identities provide a software plug-in architecture. Using this approach, an application can pass off user name mapping responsibility to a software plug-in. An example of this type of approach is found in the Lotus Domino HTTP server system provided by IBM/®. During operation, the plug-in may be passed a foreign user name and password, verify the user's information against a custom directory, and then transform the foreign user name into an identity that is recognizable and usable by the application. The plug-in returns a user name to the application by which to identify the user, and this returned user name is the name that the user is known by the application while they are using the application, and is thus the user's "effective name" for that application. The application places the effective name for that application into the SSO Web cookie. Accordingly, if a plug-in authenticates the user "uid=jdoe,cn=users,dc=myorg,dc=com", the plug-in may tell the application that the user's name has been mapped to the effective name "John M Doe/MyCompany". In this way, the user name returned by the plug-in is the user's name both for operating the application, and for placing into any SSO Web cookie. Thus there is no means for the plug-in to say that the name in the SSO Web cookie should be something other than "John M Doe/MyCompany". In these existing systems, the user name put into an SSO Web cookie must reflect the effective user identity currently operating in the current application environment. Plug-ins therefore do not provide any ability to specify an alternative user name to that understood and used by the current application.

Another possible method for dealing with additional user identities in an SSO environment is a completely custom solution, expanding on a plug-in type architecture. A plug-in can control the user name to be placed into an SSO Web cookie by the plug-in itself taking all responsibility for the SSO Web cookie, including its creation. This approach would require that each application allow delegation of SSO Web cookie responsibility to the plug-in, and likely require the application to provide extensive APIs (Application Programming Interfaces) for the necessary customization. The system or network administrator would have to provide and deploy the custom plug-in code. Such customized solutions are not desirable, because they are invariably expensive to create and support. Moreover, the problem of determining what name to place into an SSO cookie would still not be solved, but rather just passed on to the customization code, and there is no obvious way to deal with the multiple names problem there.

For the reasons above and others, it would be desirable to have a new system for providing an SSO environment, that is capable of supporting multiple user information directories, that allows users to have multiple user identifiers in different formats, and that does not require extensive customization of applications in the SSO environment to allow external handling of foreign user identifiers.

SUMMARY OF THE INVENTION

To address the above described and other shortcomings of existing solutions, a new method for providing single sign-on (SSO) user names for Web cookies in a multiple user information directory environment is disclosed. The disclosed method enables SSO access to multiple applications in situations where multiple user information directories may be deployed, and users may be known by multiple identifiers. The disclosed method enables convenient specification of which of a user's multiple user names is to be used in an SSO Web cookie that is passed from application to application to enable SSO operation. In the disclosed method, the user's SSO Web cookie user name is fully separated conceptually from the user's effective name for any application within the SSO environment. The SSO Web cookie user name provided by the disclosed method is specified independently from the name by which the user is known when operating in the Web application that writes the SSO Web cookie back to the user's computer system. Instead of including the user's effective name for an application in an SSO Web cookie provided by that application, the disclosed method facilitates use of an administratively supplied user name in SSO Web cookies. By using the disclosed method, the user name that should represent the user in an SSO Web cookie can be appropriately determined and controlled by an administrator.

During operation, in order to provide applications access to a preferred SSO Web cookie name, the disclosed method may be embodied to facilitate administrative control of the user's SSO Web cookie name in two ways:

a) adding a new field to user information records in the information directory, where the new field contains the user's SSO Web cookie user name, and/or b) designating an existing field in the directory's user information record as containing the user's SSO Web cookie user name.

Whether a new field is created in the user information record, or an existing field is reused to contain the user's SSO Web cookie user name, some applications may not consult a centralized user information store when processing an SSO Web cookie. The disclosed method advantageously operates in an SSO environment in which there are many user information directories, and no central control. Moreover, some user information directories in a given SSO environment may be modifiable, and others not modifiable. Similarly, some applications in the SSO environment may be inflexible in their use of user information directories, and poorly positioned to change in any way to accommodate multiple user names. The SSO administrator can typically determine which application is most inflexible, and what version of the user's name is expected by that inflexible application. The name format expected by such an inflexible application may be the version of the user's name to store (or locate in an existing field) using the disclosed method, so that it is used whenever possible in an SSO Web cookie for the user. Advantageously, an inflexible application and its directory infrastructure may not need to change at all, and operate successfully by receiving a name format that it expects in a format it understands within the SSO Web cookie. Other applications in the SSO environment that have flexibility to accept and map user names may compensate for such inflexible systems, and make use of the information about the user's SSO Web cookie user name that is configured using the disclosed method. For example, the disclosed method works especially well if there is only one inflexible system in the SSO environment, or if all the inflexible systems share the same definition of the user's SSO Web cookie user name.

The disclosed method is convenient, since a user's SSO Web cookie user name can be easily found using well-understood directory lookup mechanisms, and multiple user names may be handled without requiring custom plug-in code. Applications in the disclosed SSO environment retrieve the user's SSO Web cookie name information, using such lookup mechanisms, prior to creating an SSO cookie for the user. Similarly, when an SSO Web cookie is received and is found to contain a foreign user name, the foreign name can also be found using well-understood lookup mechanisms and associated with (i.e. mapped to) the name format expected by the receiving application.

Further advantages flow from using the disclosed method to designate an existing field in a user information directory user record to contain the user's SSO cookie name, rather than creating an entirely new field in the directory. For example, in the case where the desired SSO Web cookie user name is the user's e-mail address, the user information directory likely already includes a field containing that information. It is therefore not necessary for a user information directory to add the new SSO cookie user name field if an existing field can be reused. Reuse of an existing field minimizes changes to directory infrastructure, and also makes the work to populate a new SSO Web cookie user name field unnecessary and redundant. Moreover, corporate policies might prohibit administrators from adding a new field to a given user information directory. Accordingly, providing the SSO Web cookie user name information in an existing user information directory field might be the only allowed option. For these reasons, the disclosed method provides a convenient way for administrators to specify which existing field in a directory should be used to locate the appropriate Web SSO cookie user name. This association of directory fields may be accomplished by adding to the directory configuration, since the directory administrator is likely to understand the proper directory field that should be used to provide SSO Web cookie user name information. The appropriate field may differ for each directory in the configuration.

Unlike a custom code solution, the disclosed method requires much less work to deploy, and administrators will easily understand how it functions. The disclosed SSO configuration tool provides a way for the administrator to clearly indicate whether new directory information should be consulted while creating SSO Web cookies. The disclosed method provides an overall switch in the SSO configuration which must be turned on before an application will honor the administrator-supplied SSO Web cookie user name found in the directory. If the switch is off, all applications will ignore the SSO web cookie user name information found in the directory, and will continue to place the user's effective name into an SSO Web cookie that the application creates.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

As described further below, the disclosed system ensures single sign on interoperability between applications when a user has multiple user names. The disclosed system is operable in many specific situations, including those in which one or more applications in the single sign on environment are relatively flexible in their user information databases, and one or more other applications are less flexible. For example, a relatively flexible application may be able to store multiple versions of a user's name in an associated user information database, such that these user names can be recognized in SSO Web cookies, easily located in the user information database, and mapped to other corresponding user names for the user. In contrast, a relatively less flexible application may be limited in that it cannot handle multiple user names in its associated user information database.

One example of a SSO technology that may be used to implement the disclosed system is the LTPA (Lightweight Third Party Authentication) system provided by IBM® Corporation. In LTPA, the SSO cookie is sometimes referred to as the LTPA Token. Accordingly, in one embodiment of the disclosed system, there is provided a way to administratively control the user name that an application using LTPA places into an LTPA token that is created by that application.

Figure 1:
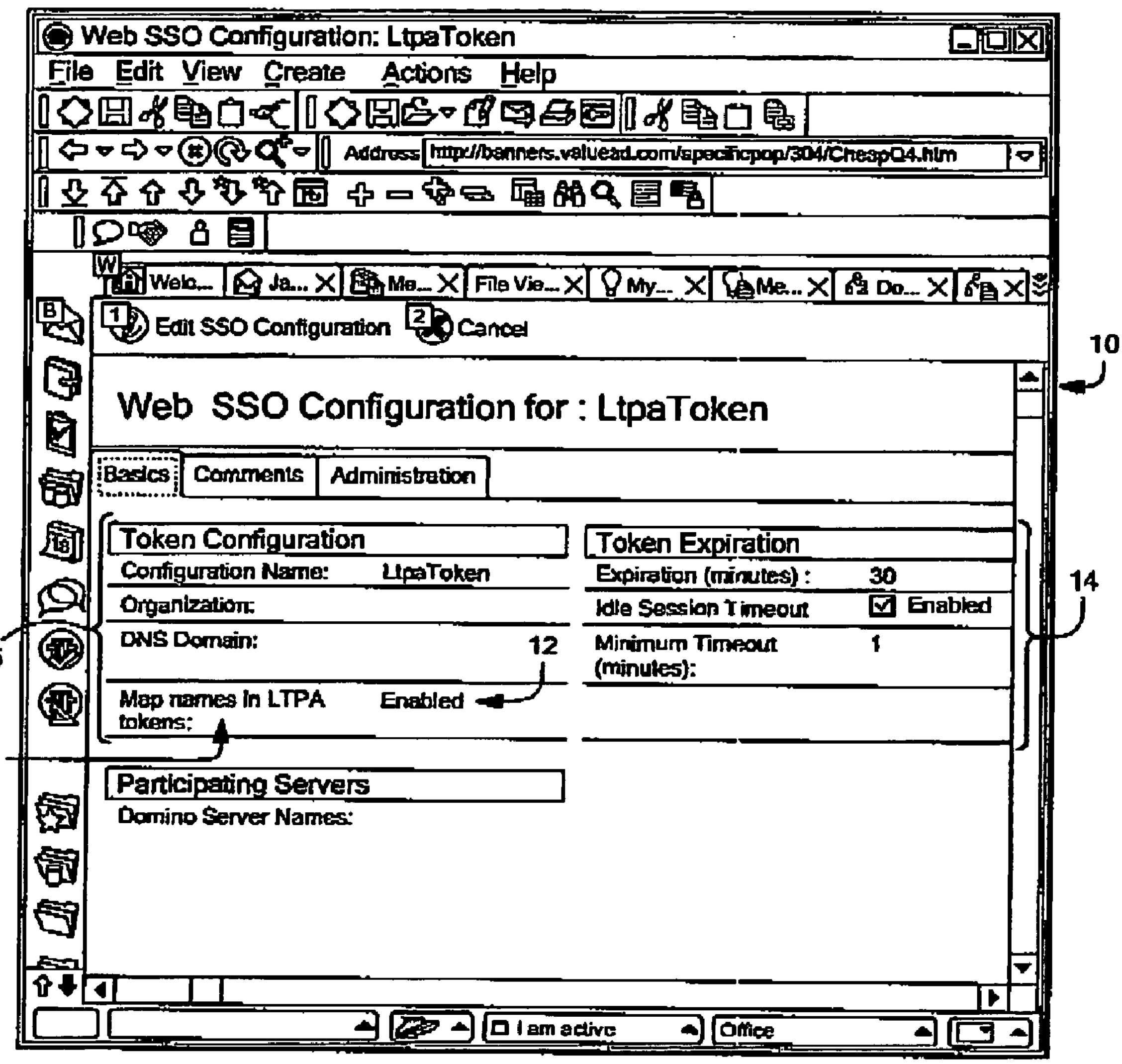
FIG. 1 is a screen shot of a portion of a user interface used to configure a software indication of whether to use administrator supplied information in the user information directory for a Web cookie user name to support single sign on operation.

As shown in FIG. 1, a screen shot 10 is a portion of a user interface that enables a user, such as an administrator, to configure a software indication of whether to use administrator supplied information in the user information directory to determine a Web cookie user name to support single sign on operation. The screen shot 10 shows how the disclosed system provides a way for an administrator to clearly indicate whether administrator-supplied information in the user directory for an application should be used when creating SSO Web cookies. If the SSO information in the user directory should not be used, then an SSO Web cookie created by the application will contain the user's effective name for that application, such as an application-specific distinguished name. Accordingly, the user interface portion shown by the screen shot 10 provides to an overall indication, referred to as a "switch" in the SSO configuration, and this switch must be turned on before an application being configured will use an administrator-supplied SSO Web cookie user name found in the application's user information directory when the application creates a Web cookie for the user. As shown in FIG. 1, the switch can be configured to enable mapping of SSO Web cookie user names to administratively provided names by entering or selecting the "Enabled" indication 12 in the field 11 labeled "Map names in LTPA tokens:", within the Token Configuration information 15. Accordingly, a "Disabled" indication would be used to disable such mapping.

It should be noted that an SSO Web cookie user name may be accepted by an application when it is received in an SSO Web cookie, even if the above described switch is turned off. If the receiving application performs a look up on the SSO Web cookie user name in the received SSO Web cookie and finds it within its user information directory, the SSO Web cookie will be honored. Accordingly, the switch must be enabled in order for an application to use the administratively supplied or indicated SSO Web cookie user name in an SSO Web cookie that is being created. Otherwise, the SSO Web cookie being created will include the user's effective name for the creating application.

For a relatively flexible application, the SSO configuration information controlled by the disclosed system may be stored in the application's associated user information directory. Intuitively, an administrator might look to this configuration information for configuration management of a user name to be provided in a SSO Web cookie by the application. Such SSO configuration information may be shared by multiple applications within the SSO environment. As shown in FIG. 1, an SSO configuration information stored in this way may, for example, contain other information about an SSO Web cookie. This other information may include token expiration information, as configured through the Token Expiration fields 14 shown in FIG. 1. Storing the SSO Web cookie user name configuration switch in this configuration information provides a user-friendly approach, helping to ensure that the configuration information will be conveniently locatable by the SSO administrator.

In the disclosed system, as shown in the screen shot 10, the contents of the field 11 is used to turn on the use of SSO directory information for user's SSO Web cookie user name. If the switch is enabled, then the applications associated with the user information directory operate to explicitly retrieve the user's configured SSO Web cookie user name before creating an SSO Web cookie for the user. If the switch is enabled, and the retrieval finds that the user has no SSO Web cookie user name supplied, then the expected behavior is that the user's effective name (i.e. the user's application-specific distinguished name) should be used in an SSO Web cookie.

Figure 2:
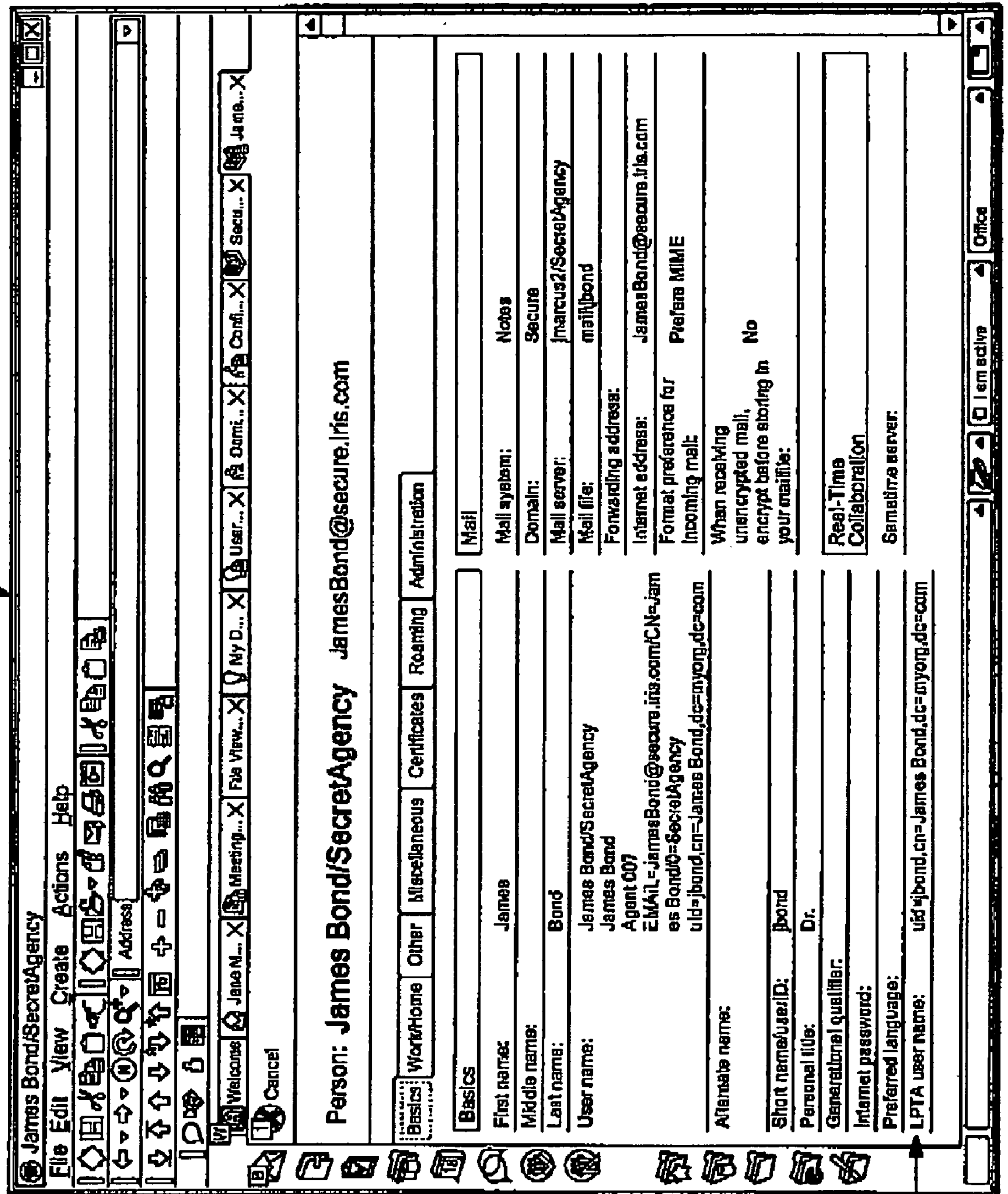
FIG. 2 is a screen shot of a portion of a user interface for adding a new field containing a Web cookie user name into a user record of a user information directory.

FIG. 2 is a screen shot 20 of a portion of a user interface for adding a new field containing a Web cookie user name into a user record of a user information directory. As shown in FIG. 2, a new field may be added to the user information directory user's record for a relatively flexible application. The new field is added to the user record in the user information directory to contain the user's SSO Web cookie user name. All applications that are integrated with the same user directory can make use of the information in this new field. For performance reasons, the user's SSO Web cookie user name should be in a easily searchable field of the database. For security reasons, only those with administrative privileges should be allowed to populate this new field on behalf of the user. An application can retrieve this information from the directory prior to creating an SSO Web cookie for a user. Foreign names, such as user names associated with a user that are not equal to the user's effective name for the application or to the user's SSO Web cookie user name, can also be defined and stored in the user's record within the user information directory. Accordingly, when an SSO Web cookie is received and found to contain such a previously stored foreign name, that foreign name can be found in the user information directory in the user record and associated with (i.e. mapped to) the name format expected by the receiving application.

For example, as in FIG. 2, the field used to store the SSO Web cookie user name may be referred to as "LTPA_Username", and loaded through the user interface of FIG. 2 through the field 22 labeled with a slightly more readable text: "LTPA user name:". The field 22 contains the user name that the associated application should place in any SSO Web cookie it creates for the user. A single value is expected as input. Accordingly, the field 22 may be a single-valued text field. In one embodiment, the field 22 is a protected field which cannot be edited by the user. Accordingly, to edit the field 22, programmatic or GUI (Graphical User Interface) administrative access requires specific access privileges. The field may populated programmatically, for example using a product such as the IBM Directory Integrator, or manually as appropriate. The field 22 may contain a user's distinguished name, a user's e-mail address, or any other unique distinguishing value for the user.

The screen shot 20 shows a user record with multiple names. The field 22, labeled "LTPA user name:", contains the user name the administrator has chosen to be used in any SSO Web cookie that is created by the application for this user. In this case, the administrator has specified that the user "James Bond/SecretAgency" should be identified in an SSO Web cookie as "uid=jbond,cn=James Bond,dc=myorg,dc=com". The name chosen presumably is the LDAP distinguished name that is expected by one or more other, less flexible applications or systems in the SSO environment.

The user's SSO Web cookie user name should be in an easily searchable field for performance reasons. In addition to adding the new field to the user record, the application's user information directory design or template must also be changed to include the LTPA_UserName field in one or more available indices or views of the directory. For example, the field should be available in a view containing a list of names in the directory to be used during searches. When an SSO Web cookie is received, the receiver must be able to resolve the user it contains, possibly mapping a foreign name to an equivalent distinguished name for the receiving application. To do this, the receiver will call standard name lookup routines, such as LDAP queries, to consult the appropriate view of the directory. For example, in the case where the application is the IBM® Lotus® Domino software application program, an embodiment of the disclosed system may obtain high performance look-ups by adding LTPA_Usemame as a column in the $USERS view and also adding it as a permutation of the first view column.

Figure 3:
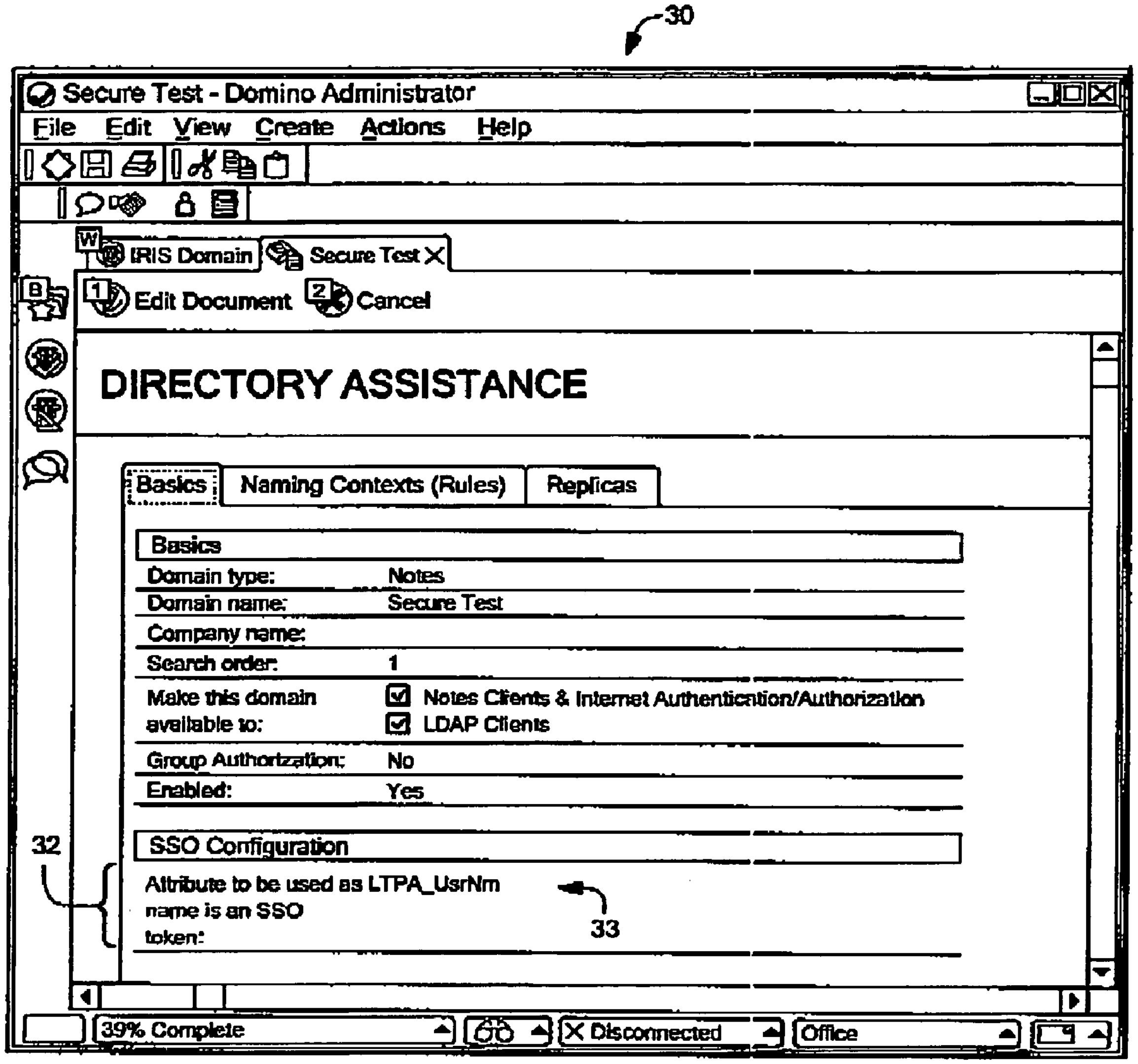
FIG. 3 is a screen shot of a portion of a user interface for enhancing a user information directory configuration to designate a field containing a Web cookie user name to support single sign on operation.

FIG. 3 is a screen shot 30 of a portion of a user interface for enhancing a user information directory configuration to designate a field containing a Web cookie user name to support single sign on operation. The user interface shown in FIG. 3 enables the disclosed system to enhance directory configuration to designate a field that contains an SSO Web cookie user name.

As previously noted, an existing field in the user directory user record can be designated to contain the user's SSO Web cookie name, rather than creating an entirely new field in the user information directory. For example, in the case where the desired SSO Web cookie user name should be the user's e-mail address, the user information directory for an application in the SSO environment likely already has a field that contains this information. Accordingly, it is not necessary for a directory to add the new SSO Web cookie user name field if an existing field can be reused. The disclosed system may accomplish this association of directory fields by adding to the user information directory configuration. The existing field to use for containing the user's SSO Web cookie user name may, for example, be designated using any specific type of directory access configuration software, such as the IBM® Lotus® Domino directory assistance feature, which is the mechanism by which IBM® Lotus® Domino directory access is configured. In such an embodiment, information relating to particular fields in the directory and how they should be managed or interpreted is available through the directory access configuration software, and the disclosed system adds more configuration information to the system for SSO purposes.

Some applications allow multiple user information directories to be searched for user information. The multiple directories that are searched may include instances of internal user information directories associated with the application, as well as external user information directories which are accessible using the LDAP protocol. It may often be most advantageous to add a new field, such as the "LTPA_UserName" field, to the directory, rather than specifying an existing field to be used. Further, it may also be convenient administratively if the administrator can specify that a field such as the "LTPA_UserName" field to be deployed across all application and external LDAP directories. However, in some cases it may be unrealistic to expect that administrators can be required to add fields into user records. A field such as "LTPA_UserName" may not already exist, and corporate policies might prohibit administrators from creating this field in the corporate LDAP directory. Therefore, the disclosed system allows administrators to specify which existing field should be used as the equivalent to the "LTPA_UserName" field, that might have been added elsewhere in the directory infrastructure.

For example, this modification may be accomplished using user associated documents, such as the Directory Assistance documents in an IBM® Lotus® Domino application system. In such an embodiment, each user information directory accessible by the application has its own document in which the SSO Web cookie user information field can be specified.

A directory administrator may be best able to understand the proper directory field that should be used to provide SSO Web cookie user name information. The appropriate field may differ for each user information directory.

In the screen shot 30 of FIG. 3, the SSO configuration for a particular user information directory includes a field 32 indicated by the text "Attribute to be used as name in an SSO token". In the example of FIG. 3, the administrator has supplied the field name "LTPA_UsrNm" 33. The field specified could be any existing field in the user directory. For example, the selected field may be one that will reliably hold an LDAP distinguished name, an e-mail name for the user, employee identifier, social security number, credit card number, or any other unique identifier for the user.

The field mapping thus provided operates such that that when the disclosed system is looking for the user's SSO Web cookie user name, and is consulting this particular user information directory for the user's record, the application's name lookup routines must return the information contained in the specified attribute field. If the specified field is not populated with any name for the user, then the expected behavior is that the application's effective name for the user should be used. For an LDAP user information directory, a special value may be defined as a valid possibility for the attribute, which indicates that the LDAP Distinguished Name of the person entry in the directory should be used. For example, the string "$DN" may be used as a short-hand code indicating that the LDAP Distinguished Name should be used. If the attribute that is selected for mapping is a multi-valued attribute, then by convention the disclosed system may use the first retrieved value for the attribute.

In order to support the above described name mapping modifications, the application's standard name lookup routines must be enhanced to find the user's configured SSO Web cookie user name in the proper directory fields—either in the new field added to the user information directory, or to the existing field that is reused to contain the user's SSO Web cookie user name. Application components that call SSO routines for creating and validating SSO cookies must accordingly be implemented or modified to provide the necessary functionality. For example, the disclosed system may include a new routine that such components may call to determine whether the SSO Web cookie name mapping switch has been turned on. When name mapping has been turned on, each component is responsible for using lookup routines to find the configured SSO Web cookie user name before the component generates a cookie. In some embodiments, the component calls to validate a received SSO Web cookie can be the same as are conventionally used, since the enhanced name lookup routines of the disclosed system may operate to take the user name in the SSO Web cookie and automatically find the corresponding distinguished name that is needed by the component.

Figure 4:
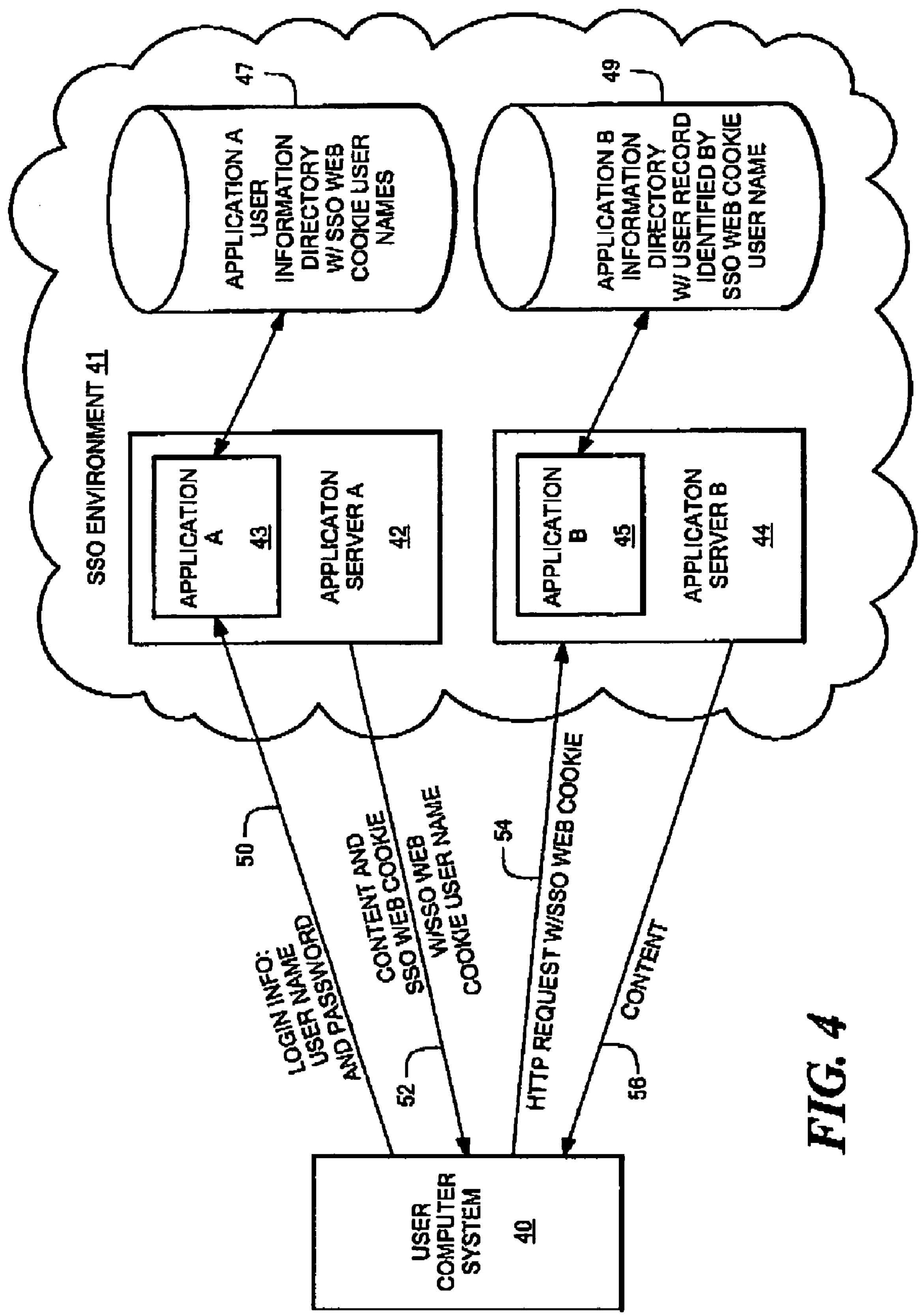
FIG. 4 is a block diagram showing operation of devices in an illustrative embodiment.

FIG. 4 is a block diagram showing operation of devices in an illustrative embodiment. As shown in FIG. 4, a user computer system 40 is communicably coupled, for example through a computer or data communication network, with an application server system A 42 and an application server system B 44 in an SSO environment 41. The application server system A 42 is shown executing an application A 43, and the application server system B 44 is shown executing an application B 45 . The application server A 42 is further shown communicably coupled to a user information directory 47 for application A 43, which includes an SSO Web cookie user name associated with a user of the user computer system 40 by a first user name for that user. The application server B 44 is further shown communicably coupled to an LDAP user information directory 49 for application B 45, which includes information about the user of the user computer system 40, and that is associated with that user by the SSO Web cookie user name. The user computer system 40, application server system A 42 and application server system B 44 may be embodied using any specific type of computer system, for example including at least one processor, computer program storage memory and/or storage devices, and one or more input/output (I/O) devices.

During operation of the devices shown in FIG. 4, the disclosed system is used to configure the user information directory 47 to either include a new field, or to indicate an existing field, for purposes of storing and retrieving an SSO Web cookie user name, that is separate and independent from the effective name of the user of the user computer system 40 for operation of application A 43. The SSO Web cookie user name advantageously be determined such that it matches a user name for the user that is known by the application B 45 and can be used to access the LDAP user information directory 49 for application B 45.

The user computer system 40 includes a Web browser computer program that is used to send login information 50, which includes a user name and password. Upon receipt of the login information 50, the application A 43 authenticates the user of the user computer system 40 based on the user name and password in the login information 50, and uses its conventional directory lookup mechanisms to access user information in the user information directory 47. The user information so accessed includes the SSO Web cookie user name that was previously configured. Application A 43 creates an SSO Web cookie including the SSO Web cookie user name obtained from the user information directory 47 using the login information 50. The SSO Web cookie user name is typically different from the user name in the login information 50, and is also likely different from the user's effective name while using application A 43. The SSO Web cookie created in this way is then sent as the content and SSO Web cookie 52 back to the user computer system 40, where it is stored by the Web browser computer system for future use.

It will be recognized that typically the login information 50 may not contain the user's effective name for application A 43. The login information 50 instead contains a relatively shorter login user name that is convenient for the user to type and remember. The browser program on the user computer system 40 simply passes whatever the user enters as a login user name to the application A 43, and application A 43 performs an initial lookup in the user information directory 47 based on the supplied login user name. The user information found by this lookup may be used to verify the password supplied in the login information 50. If the login information 50 is verified, the effective name for the user is obtained and thereafter used by application A 43 for providing services to the requesting user.

The user of the user computer system 40 then enters a URL (Uniform Resource Locator) for application B 45, which causes the Web browser program on the user computer system 40 to issue HTTP request 54, which includes the previously stored SSO Web cookie having the SSO Web cookie user name obtained from the application A user information directory 47. Application B 45 receives the HTTP request 54, and extracts the SSO Web cookie user name from the SSO Web cookie. Application B 45 then uses the SSO Web cookie user name to access user information regarding the user of the user computer system 40 contained in the LDAP user information directory 49. The SSO Web cookie user name may, for example, be the effective name for the user of the user computer system 40 with regard to the application B 45, or some other user name for the user than can be used to obtain the effective name from the user information directory 49. In this way, the disclosed system uses the SSO Web cookie user name in the HTTP request 54 to authenticate the user without having to prompt the user a second time for a password. Accordingly, the application B 45 provides content 56 to the user computer system 40.

In the above description, an example of a relatively more flexible application program, in terms of the modifiability of a user information directory, is given as the Domino application program provided by IBM®. However, those skilled in the art will recognize that the present invention is not so limited, and that a wide variety of specific application programs may be used in an SSO environment supported using the disclosed system.

It will be understood that the functions of the disclosed system as herein described may be implemented by computer program instructions. These computer program instructions may be loaded onto a computer or other programmable data processing apparatus to produce a machine, such that the instructions which execute on the computer or other programmable data processing apparatus create means for implementing the functions of the disclosed system. These computer program instructions may also be stored in a computer-readable memory that can direct a computer or other programmable data processing apparatus to function in a particular manner, such that the instructions stored in the computer-readable memory produce an article of manufacture including instruction means which implement the functions of the disclosed system. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions of the disclosed system.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program command structures and interfaces, one skilled in the art will recognize that the system may be embodied using a variety of specific command structures or interfaces. Accordingly, the invention should not be viewed as limited except by the scope and spirit of the appended claims.

We claim:

1. A method for providing a single sign-on application environment having multiple user information directories, comprising:

determining a single sign-on Web cookie user name field by providing a user interface to an administrator user through which said administrator user designates an existing field in user information records in a first user information directory associated with a first application program, wherein said existing field is used to store administrator supplied single sign-on Web cookie user names;

storing a single sign-on Web cookie user name in association with a login user name off a user for said first application program in said single sign-on application environment, wherein said single sign-on Web cookie user name is stored in said designated existing field in said first user information directory associated with said first application program, wherein said one of said single sign-on Web cookie user names is different from said login user name of said user;

receiving, by said first application program, a service request from said user on a user computer system, wherein said service request includes said login user name for said user for said first application program in said single sign-on application environment and a password;

authorizing use of said first application program by said user based on said login user name and said password;

retrieving, by said first application program, responsive to said login user name, and further responsive to said designation by said administrator user of said existing field in said user information records in said first user information directory associated with said first application program, said single sign-on Web cookie user name from said designated existing field in said user information records in said first user information directory;

forming, by said first application program, a single-sign on Web cookie including said single sign-on Web cookie user name; and passing said single sign-on Web cookie from said first application program to said user computer system.

2. The method of claim 1, further comprising:

receiving, by a second application program in said single-sign on application environment, a service request from said user on said user computer system, said service request including said Web cookie including said single sign-on Web cookie; and authorizing use of said second application program by said user based on said single-sign on Web cookie user name in said single sign-on Web cookie.

3. The method of claim 2, wherein said Web cookie user name is an effective name for said user in said second application program in said single sign-on application environment.

4. The method of claim 1, wherein said determining said single sign-on Web cookie user name further comprises:

providing a user interface for specifying a new field to be added to user information records in said first user information directory associated with said first application program, wherein said new field is operable to contain said single sign-on Web cookie user name; and adding said new field to said information records in said first user information directory associated with said first application program.

* * * * *